United States Patent
Kim et al.

(10) Patent No.: US 8,548,514 B2
(45) Date of Patent: Oct. 1, 2013

(54) METHOD FOR RESOURCE ELEMENT GROUP DOWNSIZING OF R-PDCCH AND MOBILE TELECOMMUNICATION SYSTEM FOR THE SAME

(75) Inventors: Sang Ha Kim, Seoul (KR); Hong Sup Shin, Seoul (KR); Young Jun Kim, Anyang-si (KR); Byoung-Seong Park, Incheon (KR); Il Doo Chang, Anyang-si (KR); Hee Bong Lee, Seoul (KR)

(73) Assignee: LG-Ericsson Co., Ltd., Seoul (KR)

( * ) Notice: Subject to any disclaimer, the term of this patent is extended or adjusted under 35 U.S.C. 154(b) by 310 days.

(21) Appl. No.: 13/016,231

(22) Filed: Jan. 28, 2011

(65) Prior Publication Data

US 2012/0040704 A1   Feb. 16, 2012

(30) Foreign Application Priority Data

Aug. 11, 2010 (KR) .................. 10-2010-0077367

(51) Int. Cl.
*H04W 84/08* (2009.01)
(52) U.S. Cl.
USPC ........... 455/509; 455/420; 455/450; 455/515; 370/329; 370/315; 370/241; 370/328
(58) Field of Classification Search
USPC ............ 455/509, 269, 500, 115.1, 552.1, 455/67.11, 13.1, 7, 458, 450, 420; 375/260, 375/211; 370/315, 329, 312, 338, 255, 330, 370/328, 228, 241; 707/758
See application file for complete search history.

(56) References Cited

U.S. PATENT DOCUMENTS

| | | | |
|---|---|---|---|
| 2010/0061345 A1* | 3/2010 | Wengerter et al. | 370/335 |
| 2010/0150090 A1* | 6/2010 | Park et al. | 370/329 |
| 2011/0007695 A1* | 1/2011 | Choi et al. | 370/329 |
| 2011/0103292 A1* | 5/2011 | Pasad et al. | 370/315 |
| 2011/0141928 A1* | 6/2011 | Shin et al. | 370/252 |
| 2011/0255486 A1* | 10/2011 | Luo et al. | 370/329 |
| 2011/0299484 A1* | 12/2011 | Nam et al. | 370/329 |
| 2011/0317615 A1* | 12/2011 | Soong et al. | 370/315 |
| 2012/0008586 A1* | 1/2012 | Kwon et al. | 370/329 |
| 2012/0063386 A1* | 3/2012 | Park et al. | 370/315 |
| 2012/0078933 A1* | 3/2012 | Kim et al. | 707/758 |
| 2012/0093082 A1* | 4/2012 | Kim et al. | 370/328 |
| 2012/0113884 A1* | 5/2012 | Park et al. | 370/312 |
| 2012/0114021 A1* | 5/2012 | Chung et al. | 375/211 |
| 2012/0155561 A1* | 6/2012 | Seo et al. | 375/260 |
| 2012/0163288 A1* | 6/2012 | Kim et al. | 370/315 |
| 2012/0263134 A1* | 10/2012 | Malladi et al. | 370/329 |
| 2012/0314567 A1* | 12/2012 | Seo et al. | 370/228 |
| 2013/0010685 A1* | 1/2013 | Kim et al. | 370/315 |
| 2013/0016653 A1* | 1/2013 | Kim et al. | 370/315 |
| 2013/0034070 A1* | 2/2013 | Seo et al. | 370/329 |
| 2013/0034072 A1* | 2/2013 | Kim et al. | 370/329 |
| 2013/0058304 A1* | 3/2013 | Kim et al. | 370/329 |
| 2013/0064099 A1* | 3/2013 | Kim et al. | 370/241 |
| 2013/0114539 A1* | 5/2013 | Kim et al. | 370/329 |

* cited by examiner

*Primary Examiner* — Tan Trinh
(74) *Attorney, Agent, or Firm* — KED & Associates, LLP

(57) ABSTRACT

The present invention relates to a method for reducing a resource element group (REG) size, which is used at a control channel element (CCE) for a relay physical downlink control channel (R-PDCCH), for the purpose of easy interleaving by a physical resource block (PRB) unit for the R-PDCCH, and a mobile telecommunication system for the same. The mobile telecommunication system of the present invention includes reducing the CCE size to 8 REGs or less of the R-PDCCH to be included in a single PRB.

10 Claims, 5 Drawing Sheets

FIG. 3

| Bandwidth | 6PRBs | 15 | 25 | 50 | 75 | 100 |
|---|---|---|---|---|---|---|
| Format 0 | 37bits | 38 | 41 | 43 | 43 | 44 |
| Format 1A | 37 | 38 | 41 | 43 | 43 | 44 |
| Format 3/3A | 37 | 38 | 41 | 43 | 43 | 44 |
| Format 1C | 24 | 26 | 28 | 29 | 30 | 31 |
| Format 1 | 35 | 39 | 43 | 47 | 49 | 55 |
| Format 1B (2 tx ant) | 38 | 41 | 43 | 44 | 45 | 46 |
| Format 1D (2 tx ant) | 38 | 41 | 43 | 44 | 45 | 46 |
| Format 2 (2 tx ant) | 47 | 50 | 55 | 59 | 61 | 67 |
| Format 2A (2 tx ant) | 44 | 47 | 52 | 57 | 58 | 64 |
| Format 1B (4 tx ant) | 41 | 43 | 44 | 46 | 47 | 49 |
| Format 1D (4 tx ant) | 41 | 43 | 44 | 46 | 47 | 49 |
| Format 2 (4 tx ant) | 50 | 53 | 58 | 62 | 64 | 70 |
| Format 2A (4 tx ant) | 46 | 49 | 54 | 58 | 61 | 66 |
| Format 2B | 44 | 47 | 52 | 57 | 58 | 64 |

METHOD FOR RESOURCE ELEMENT GROUP DOWNSIZING OF R-PDCCH AND MOBILE TELECOMMUNICATION SYSTEM FOR THE SAME

CROSS-REFERENCE TO RELATED APPLICATIONS

The present application claims priority from Korean Patent Application No. 10-2010-0077367 (filed on Aug. 11, 2010), the entire subject matters of which is incorporated herein by reference.

TECHNICAL FIELD

The present invention relates to a method for reducing a size of a resource element group (REG) contained in one control channel element (CCE) for a relay physical downlink control channel (R-PDCCH), for the purpose of easy interleaving by a physical resource block (PRB) unit for the R-PDCCH, and a mobile telecommunication system for the same.

BACKGROUND

In a long term evolution advanced (LTE-A, fourth generation mobile communication) frequency division duplex (FDD) type, a fixed relay node (RN), which shares the same frequency on an Uu interface representing an interface between the RN and a user equipment (UE) and an Un interface representing an interface between a base station (eNB) and the RN and is located in a region in which incoming and outgoing signals are not isolated, is called as a Type1 RN. The Type1 RN uses a demodulation reference signal (DMRS) for demodulation upon a relay physical downlink control channel (R-PDCCH). The Type1 RN considers resource wastage and robustness, which are occurred for the R-PDCCH to perform an effective resource mapping of the R-PDCCH, and performs interleaving on a basis of a physical resource block (PRB) for the R-PDCCH, which is different from a release 8 (REL-8) PDCCH.

FIG. 1 is a schematic diagram showing backhaul signaling in the Type1 RN. As shown in FIG. 1, in the case of the Type1 RN, backhaul data and control data are exchanged between the RN and a donor eNB through time division multiplexing (TDM) based half duplexing to avoid a self interference (SI). The donor eNB represents a base station including a relay node.

A data transmission from the eNB to the RN is performed by using a specific subframe. The subframe is transmitted from the RN to the UEs through a system information block (SIB) as a multimedia broadcasting single frequency network (MBSFN) subframe. Furthermore, a cell specific reference signal (CRS), a physical hybrid-ARQ indicator channel (PHICH) and a physical control format indicator channel (PCFICH) for measuring channel quality information (CQI) of the UEs existing within the coverage of the RN are transmitted on a control part 10 of the MBSFN subframe and the PDCCH should be transmitted except a downlink (DL) grant. Furthermore, there is no data transmission on a data part 20 of the MBSFN sub frame for the UEs existing within the coverage of the RN and only data received from the eNB are transmitted on the data part 20 of the MBSFN subframe.

A subframe number for the Un interface, a frequency location in the subframe for the R-PDCCH and a start symbol location of the R-PDSCH are transmitted by using radio resource control (RRC) signaling that is set once and then intermittently reset by the donor eNB for each RN. The DL grant for the RN is always located at a first slot of the subframe and an uplink (UL) grant may be located at a second slot of the same PRB including the DL grant, if the UL grant exists.

At release 10 (REL-10), the DMRS is a reference signal separable for each of the UEs, unlike the CRS, which has been adopted for demodulation of the PDSCH in a transmission of a higher order multiple input and multiple output (MIMO) (8*8). The DMRS signals of the first and second slots are code division multiplexed (CDM). Accordingly, the DMRS signals should be located in the same PRB, in which the PDSCH is located, for the demodulation of the PDSCH. When this is applied to the R-PDCCH, if the UL grant for the RN exists in the PRB, in which the DL grant for the RN is located, then the UL grant must be always located in the second slot of the PRB. The UL grant can't be transmitted through multiple PRBs for acquisition of frequency diversity, unlike the CRS transmitting a common signal value through all frequency bands for demodulating the PDCCH of a Macro UE. Eventually, the R-PDCCH should be mapped on a basis of the PRB identical to the DMRS based PDSCH. That is to say, if the DMRS based R-PDCCH was transmitted to all frequency bands through a resource element group (REG) based interleaving, then it may not be possible to demodulate the R-PDCCH based on the DMRS by the RN. Accordingly, the R-PDCCH for a specific RN should be located in the PRB for the R-PDCCH previously transmitted for the specific RN, when the R-PDCCH based on the DMRS is applied.

At REL-8, a size of a control channel element (CCE) for the PDCCH is defined as 9 REGs. Signals of the REL-8 are transmitted by applying an aggregation level of 1, 2, 4 or 8 according to a link quality of the UE, and the signals of the REL-8 are received by using a blind detection method at the UE. That is to say, the signals are interleaved on a basis of the REG size at all frequency bands for transmission such as 9 REGs at the aggregation level of 1, 18 REGs at the aggregation level of 2, 36 REGs at the aggregation level of 4 and 72 REGs at the aggregation level of 8. Although the signals exceed the REG size acceptable in one PRB, all system bandwidths are interleaved at an interleaving size, so that there is no problem to acquire the frequency diversity.

This issue has been discussed many times, however, it has been decided to define the 9 REGs as the 1CCE size in the DMRS or CRS based R-PDCCH. Prior to this decision, there was an proposal suggesting the use of a 16-quadrature amplitude modulation (QAM) in the case of the RN instead of quadrature phase shift keying (QPSK), which is used for the PDCCH of a frequently moving UEs at the REL-8, under the condition that sufficient backhaul radio quality is provided by fixedly positioning the Type1 RN in the LTE-A. However, when the 16 QAM is used at downlink control information (DCI) formats, which may be expected to be used frequently for the R-PDCCH, a redundancy and a padding overhead may be considerably increased against real information. Furthermore, because all the Type1 RNs on a cell don't have best backhaul quality of service (QoS), a decoding success rate of the R-PDCCH for a specific RN declines noticeably when using the 16 QAM, which may be negatively affected to a capacity of whole network. If a carrier aggregation is applied to the RN, then a carrier indication field (CIF) of three bits may be added to almost all the DCI formats and it may not be easy to predict what kinds of information elements are added to the DCI format except for the CIF. FIG. 2 is a schematic diagram showing a DMRS based R-PDCCH for the Type1 RN. At the 3GPP, even if there is waste of a resource due to some redundancies and padding overhead in applying the DMRS based R-PDCCH, such as the REG regions indicated by lattices in FIG. 2, a discussion about a change of the REG size itself within a category minimizing a change of a REL-8 specification has been stopped. Considering the above, a symbol number of PDCCH for the UL grant is increased to seven symbols such that the symbol number for the DL grant becomes asymmetric with the symbol number for the UL grant. The information element, which is added to the DCI format for the Macro UE of the REL-10 considering the 3GPP specification and a forward compatibility, is nothing but size increasing of the DCI format for the CIF and the UL single user MIMO (SU-MIMO). The purpose of the addition of the information element is minimum impact of the specification and simplification of the specification for adoption of a fast RN to the REL-10.

As shown in FIG. 2, because the 9 REGs are not included in a single PRB, a repetition and a padding are additionally performed at the last region of the R-PDCCH through 2 PRBs, when there is no change of the CCE size of the DL grant defined at the 3GPP. Because the Type1 RN is fixed, the repetition and the padding are treated as waste of the resources, when the radio quality of the UE of the Type1 RN is better than that of a normal UE in some degree. Because the repetition and the padding are performed in the case of the UL grant as same as the DL grant, the repetition and the padding are causing waste of the resources.

A donor eNB, which has whole frequency bandwidths less than 10 PRBs, can't have the REL-10 RN. The DCI format size, which will be increased by adoption of the UL SU-MIMO, may not over seventy bits defined at the REL-8 for the DL SU-MIMO based on 100 PRB. As shown in FIG. 4, the DCI of seventy-three bits, which is maximum size at the REL-8/9, will be mapped to 37 resource elements (REs), i.e. 10 REG at the REL-10 through the QPSK. As shown in FIG. 2, the PRB has shortage of 2 REG in the DMRS based R-PDCCH, especially a case of the DL grant. So there is a problem that another PRB is needed for accommodation of the 2 REGs.

SUMMARY

According to an aspect of the invention, there is provided a method for reducing a resource element group (REG) size, which is used at a control channel element (CCE) for a relay physical downlink control channel (R-PDCCH), for the purpose of easy interleaving by a physical resource block (PRB) unit for the R-PDCCH, and a mobile telecommunication system for the same.

In one embodiment of the invention, a method for reducing a resource element group (REG) size of a relay physical downlink control channel (R-PDCCH) includes reducing a control channel element (CCE) size of the R-PDCCH to be included in a physical resource block (PRB).

In another embodiment, the mobile telecommunication system includes reducing the CCE size to 8 REGs or less of the R-PDCCH to be included in the PRB.

BRIEF DESCRIPTION OF THE DRAWINGS

FIG. 3 is a schematic diagram showing a downlink control information (DCI) information size according to a system bandwidth.

DETAILED DESCRIPTION

A detailed description may be provided with reference to the accompanying drawings. One of ordinary skill in the art may realize that the following description is illustrative only and is not in any way limiting. Other embodiments of the present invention may readily suggest themselves to such skilled persons having the benefit of this disclosure.

Figure 1:
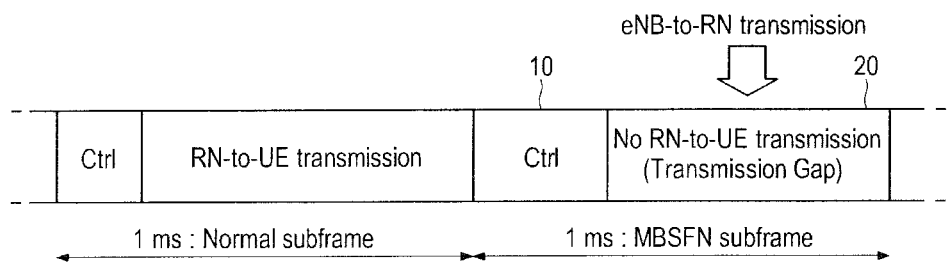
FIG. 1 is a schematic diagram showing backhaul signaling of a Type1 RN.
Figure 2:
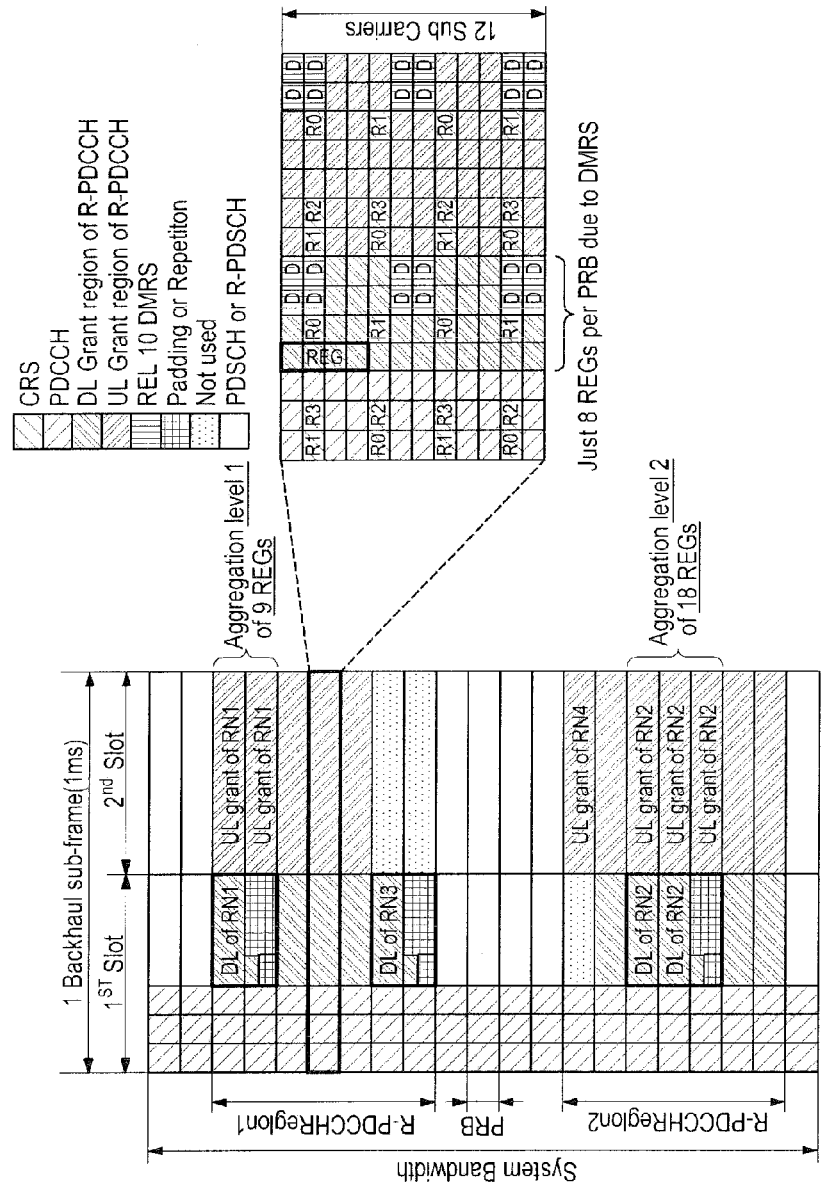
FIG. 2 is a schematic diagram showing a demodulation reference signal (DMRS) based relay physical downlink control channel (R-PDCCH) for a Type1 RN.
Figure 4:
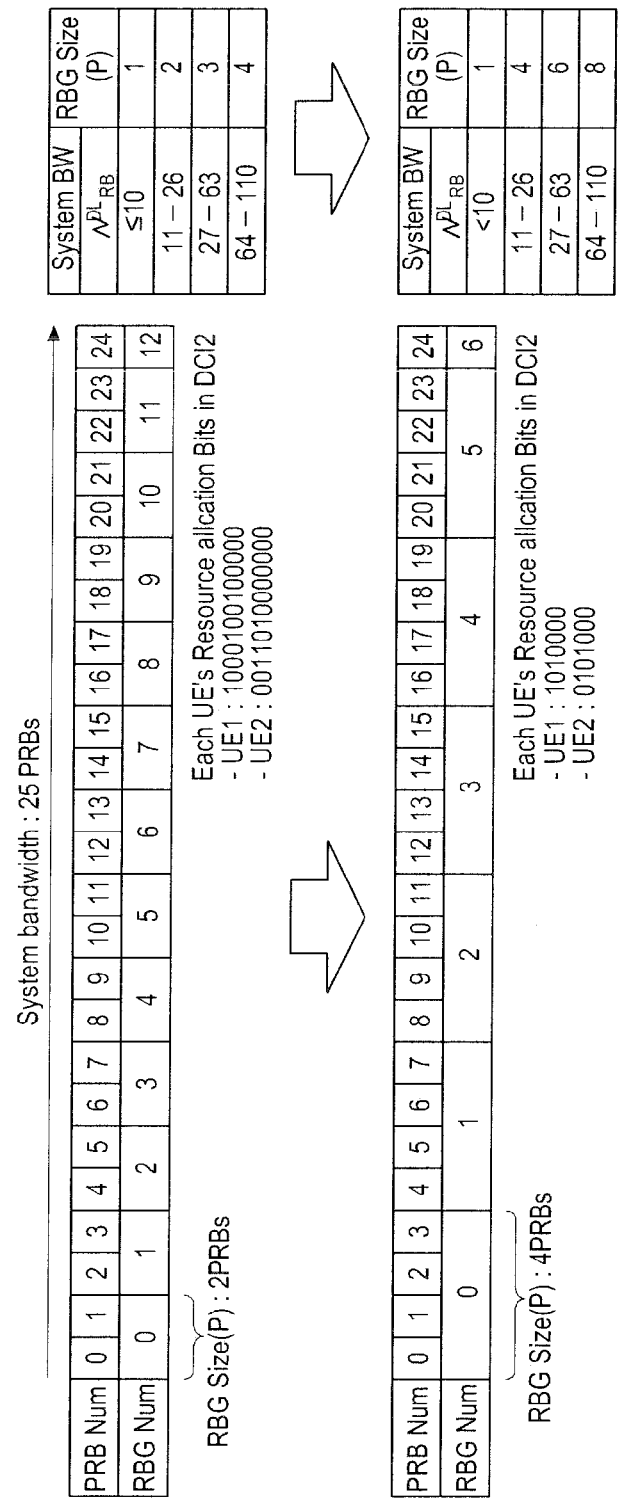
FIG. 4 is a schematic diagram showing an illustrative embodiment of a resource allocation type 0.
Figure 5:
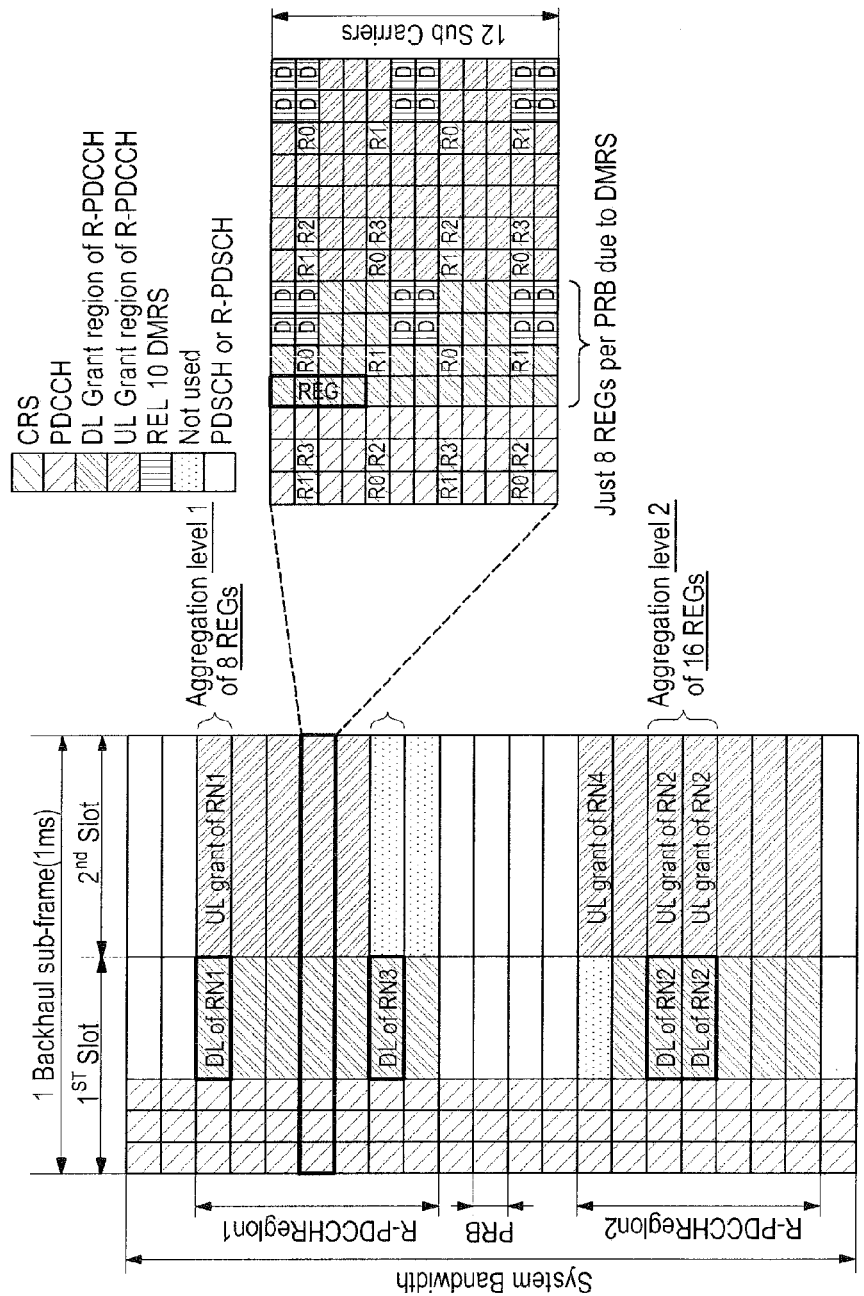
FIG. 5 is a schematic diagram showing an illustrative embodiment of a DMRS based R-PDCCH for a Type1 RN.

FIG. 3 is a schematic diagram showing a downlink control information (DCI) information size according to the system bandwidth, FIG. 4 is a schematic diagram showing a resource allocation type 0 and FIG. 5 is a schematic diagram showing a demodulation reference signal (DMRS) based relay physical downlink control channel (R-PDCCH) for the Type1 RN.

The present invention suggests a method for reducing without changing a content of the DCI information signaling with one PRB, i.e. 8 REG, containing all the DCI information for the RN and 3 bits for a carrier indication field (CIF), which is expected to be added to the PRB, and demodulating through the QPSK method, which is highly unlikely that the QPSK method is influenced at a backhaul radio quality for the RN, when considering the R-PDCCH of aggregation level 1, that is 1 CCE size to be signaled. As shown in FIG. 4, a DCI format 2 is most frequently used for the DL grant of the RN. The DCI format 2 is a regulation for reducing from 73 bits to 64 bits, i.e. 32 RE, 8 REG, for accommodating 73 bits on 8 REG.

At a release 8 or 9 (REL-8/9), a conception of a resource block group (RBG) has been adopted to reduce a bit size for resource allocation bits included in the DCI in allocating the PRB for the PDSCH. That is to say, multiple RBGs may be allocated to the scheduled UE. One RBG includes a size of continuative PRBs. As shown in FIG. 4, the size of the set of the continuative PRBs, i.e. the RBG size, is defined according to the system bandwidth. In the DCI format 2, the set of PRBs for the PDSCH is signaled through the resource allocation type 0 or 1. FIG. 4 is a schematic diagram showing the resource allocation type 0.

As shown in FIG. 4, in the case of the DCI format 2 using the resource allocation type 0, the resource allocation bit size required for resource block (RB) assignment may be calculated by the following equation (1).

$$N_{RB}^{DL}/P(bits) \quad [\text{Equation (1)}]$$

wherein $N_{RB}^{DL}$ denotes the number of the PRBs, i.e. the system bandwidth and P denotes the size of the RBG. If the result from the equation (1) contains decimal fractions, the smallest integer, which is greater than the result, is calculated as the bit size for the RB assignment. For example, assuming that there are 25 PRBs and the RBG size is 4, the bit size for the RB assignment becomes 7 bits.

Meanwhile, in the case of the DCI format 2 using the resource allocation type 1, the resource allocation bit size required for the RB assignment may be calculated by the following equation (2).

[Equation 2]

$$(N_{RB}^{DL}/P)-(\log_2(P))-1(bits) \quad (2)$$

Wherein the results of $N_{RB}^{DL}/P$ and $\log_2(P)$ are determined to the smallest integers, which are equal to or greater than the results thereof, respectively.

The present invention considers a fundamental property of the RN in a release 10 (REL-10). As shown in FIG. 3, a minimum set of the resource allocation bits for one of the typical UEs in the REL-8/9 is tabulated. The RN may be considered as one UE in point of view of the donor eNB, however, the RN may simultaneously transmit data for the multiple UEs under the coverage thereof, so that the RN is different from the typical UE. That is to say, the RN transmits the data through the RBG, which is a set of the multiple PRBs, on the backhaul frame while the data are transmitted through the PRB at the UE. Accordingly, defining the RBG size for the RN to be larger than that for the UE is to reflect the property of the RN. In one embodiment, as shown in FIG. 4, the RBG size for the RN is defined by multiplying the RBG size for the UE by 2.

Consequentially, in the case of the DMRS based R-PDCCH, a robustness of the R-PDCCH, which is same as the REL-8/9 and a decrease of unnecessary resource wastage can be achieved by reducing the CCE size to 8 REGs to be included in one PRB by reducing the DCI size to 64 bits or less based on 100 PRBs by reducing the required bit size for the resource allocation bits included in the DCI for the R-PDSCH. In one embodiment, referring to tables of FIG. 4, the RBG size P is 8 for the RN at the system bandwidth of 100 PRBs. In the case of the resource allocation type 0, the size of the resource allocation bits for the RB allocation may be reduced from 100/4=25 bits to 100/8=13 bits, i.e., by 12 bits, so that 61 bits (70 bits (bandwidth of 100 PRBs in DCI format 2 of FIG. 3)+3 bits (CIF)−12 bits) are only required even after adding the 3 bits of the CIF. Thus, the data may be mapped on one PRB including 8 REGs.

The present invention proposes a change of a RBG table for the UE on the REL-10 Un interface. The changed RBG table is applied to the R-PDCCH on the Un interface. The RBG size according to the system bandwidth may not be defined.

Consequentially, when applying the present invention, the aggregation level of the RN is a size of the set of PRBs for the R-PDCCH of the RN. Because a position and a size of the PRB for the R-PDCCH are minimized, it may be possible to use more resources for the R-PDSCH and the PDSCH.

Any reference in this specification to "one embodiment," "an embodiment," "example embodiment," "illustrative embodiment," etc. means that a particular feature, structure or characteristic described in connection with the embodiment is included in at least one embodiment of the present invention. The appearances of such phrases in various places in the specification are not necessarily all referring to the same embodiment. Further, when a particular feature, structure or characteristic is described in connection with any embodiment, it is submitted that it is within the purview of one skilled in the art to affect such feature, structure or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, numerous variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for reducing a resource element group (REG) size of a relay physical downlink control channel (R-PDCCH) comprising:
    reducing a control channel element (CCE) size of the R-PDCCH to be included in a single physical resource block (PRB); and
    downsizing a size of resource allocation bits included in a downlink control information (DCI) to downsize the CCE size.

2. The method of claim 1, wherein the CCE size is reduced to 8 REGs or less.

3. The method of claim 2, wherein the R-PDCCH uses a demodulation reference signal (DMRS) or a cell specific reference signal (CRS).

4. The method of claim 1, wherein the resource allocation bits is determined to a smallest integer greater than a result from dividing a system bandwidth by a resource block group (RBG) size.

5. The method of claim 4, wherein the RBG size is twice the RBG size for a user equipment (UE) according to the system bandwidth.

6. The method of claim 1, wherein the resource allocation bits is calculated by equation (1), $$(N_{RB}^{DL}/P)-(\log_2(P))-1 \text{(bits)} \tag{1}$$

wherein results of $N_{RB}^{DL}/P$ and $\log_2(P)$ are determined to the smallest integers, which are equal to or greater than the results thereof, respectively.

7. A mobile telecommunication system comprising:
    reducing a control channel element (CCE) size of a relay physical downlink control channel (R-PDCCH) to 8 resource element groups (REGs) or less to be included in a physical resource block (PRB), and
    reducing a size of resource allocation bits included in a downlink control info nation (DCI) for reducing of the CCE size.

8. The mobile telecommunication system of claim 7, wherein the resource allocation bits is determined to a smallest integer greater than an amount resulting from dividing a system bandwidth by a resource block group (RBG).

9. The mobile telecommunication system of claim 8, wherein the RBG size is twice than the RBG size for a user equipment (UE) according to the system bandwidth.

10. The mobile telecommunication system of claim 8, wherein the R-PDCCH uses a demodulation reference signal (DMRS) or a cell specific reference signal (CRS).

* * * * *